(12) United States Patent
Singla et al.

(10) Patent No.: US 12,352,076 B2
(45) Date of Patent: Jul. 8, 2025

(54) MAGNETIC CLOSURE SYSTEM FOR A DEVICE

(71) Applicant: Microsoft Technology Licensing, LLC, Redmond, WA (US)

(72) Inventors: Aseem Singla, Seattle, WA (US); Joseph Benjamin Gault, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 332 days.

(21) Appl. No.: 17/922,497

(22) PCT Filed: May 12, 2021

(86) PCT No.: PCT/US2021/032023
§ 371 (c)(1),
(2) Date: Oct. 31, 2022

(87) PCT Pub. No.: WO2021/231593
PCT Pub. Date: Nov. 18, 2021

(65) Prior Publication Data
US 2023/0193659 A1    Jun. 22, 2023

(30) Foreign Application Priority Data

May 14, 2020    (NL) .................................... 2025586

(51) Int. Cl.
*E05B 47/00*    (2006.01)
*G06F 1/16*    (2006.01)
*H01F 7/02*    (2006.01)

(52) U.S. Cl.
CPC ........ *E05B 47/0038* (2013.01); *G06F 1/1616* (2013.01); *G06F 1/1679* (2013.01); *H01F 7/0263* (2013.01)

(58) Field of Classification Search
CPC ............. E05B 47/0038; E05B 65/0067; G06F 1/1616; G06F 1/1679; H01F 7/0263; H04M 1/2014
See application file for complete search history.

(56) References Cited

U.S. PATENT DOCUMENTS 6,366,440 B1 *    4/2002  Kung .................... E05C 19/16
                                                361/679.55
6,891,722 B2      5/2005  Chen et al.
(Continued)

FOREIGN PATENT DOCUMENTS

| EP | 3379809 A1 | 9/2018 |
|---|---|---|
| EP | 3598266 A1 | 1/2020 |
| FR | 3080010 A1 | 10/2019 |

OTHER PUBLICATIONS

"Search Report Issued in Netherlands Patent Application No. N2025586", Mailed Date: Feb. 23, 2021, 12 Pages.
(Continued)

*Primary Examiner* — Michael P Ferguson
*Assistant Examiner* — Thomas L Neubauer
(74) *Attorney, Agent, or Firm* — NovoTechIP International PLLC

(57) ABSTRACT

An improved method and system for providing a magnetic closure system for an electronic device (100) may include a first portion (130), a second portion (150), a connecting element (145) pivotally connecting the first portion to the second portion and configured to enable the electronic device to fold between a closed position and an open position, and a magnetic element (160, 165) for providing a closure force to bias the electronic device in the closed position. The magnetic element may include a first magnet pair and a second magnet pair, each of the first magnet pair and second magnet pair including a first magnet housed within the first portion and a second magnet housed within (Continued)

the second portion. The first magnet pair may provide an attractive magnetic force that biases the electronic device in the closed position, while the second magnet pair may provide a repelling magnetic force that partially counteracts the biasing from the attractive magnetic force as a gap between the first portion and the second portion decreases, and a pole size of the second magnet pair is smaller than a pole size of the first magnet pair.

20 Claims, 8 Drawing Sheets

(56) References Cited

U.S. PATENT DOCUMENTS

| | | | |
|---|---|---|---|
| 8,662,298 B2 | 3/2014 | Aldana et al. | |
| 8,705,229 B2 | 4/2014 | Ashcraft et al. | |
| 9,342,102 B2 | 5/2016 | Kim | |
| 10,503,216 B2 | 12/2019 | Weldon et al. | |
| 2005/0018393 A1 | 1/2005 | Kuo | |
| 2007/0138806 A1* | 6/2007 | Ligtenberg | G06F 1/1616 |
| | | | 292/251.5 |
| 2011/0068885 A1* | 3/2011 | Fullerton | H01F 7/021 |
| | | | 335/306 |
| 2012/0326871 A1* | 12/2012 | Lian | E05B 73/0017 |
| | | | 340/572.1 |
| 2014/0254077 A1 | 9/2014 | Griffin et al. | |
| 2016/0180997 A1* | 6/2016 | Fullerton | H01F 7/021 |
| | | | 335/296 |
| 2018/0364761 A1* | 12/2018 | Lin | G06F 1/1652 |
| 2019/0164675 A1* | 5/2019 | Srinivasan | E05C 19/16 |
| 2019/0215975 A1* | 7/2019 | Alva | H01F 7/0252 |
| 2020/0017957 A1 | 1/2020 | Zang et al. | |

OTHER PUBLICATIONS

"International Search Report and Written Opinion Issued in PCT Application No. PCT/US21/032023", Mailed Date: Aug. 12, 2021, 23 Pages.

Yamaguchi, et al., "Multimotion Analysis of Opening and Closing Sensor for Windows using 3-D Finite-Element Method", In Journal of IEEE Transactions on Magnetics, vol. 42, Issue 4, Apr. 2006, pp. 1015-1018.

Communication under Rule 71(3) Received in European Patent Application No. 21730037.5, mailed on May 23, 2025, 08 pages.

* cited by examiner

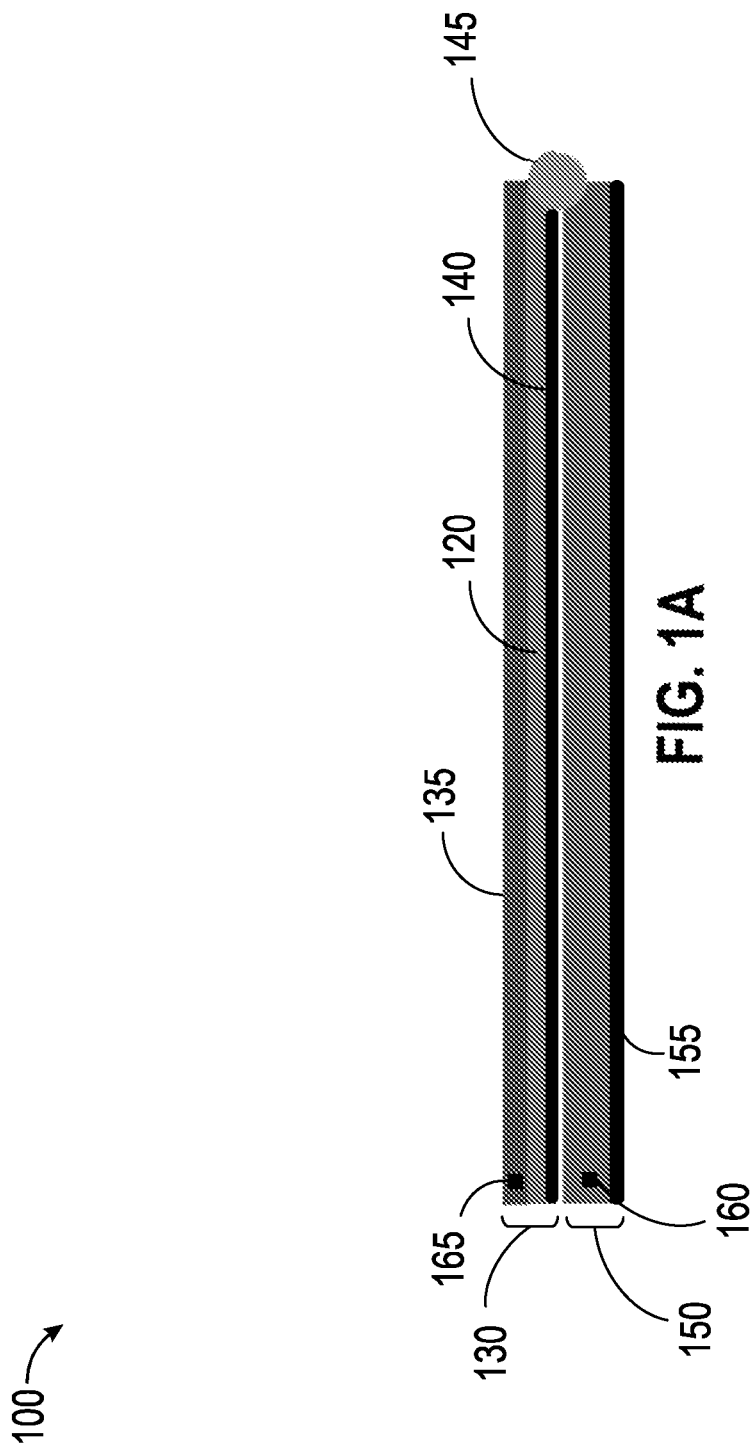

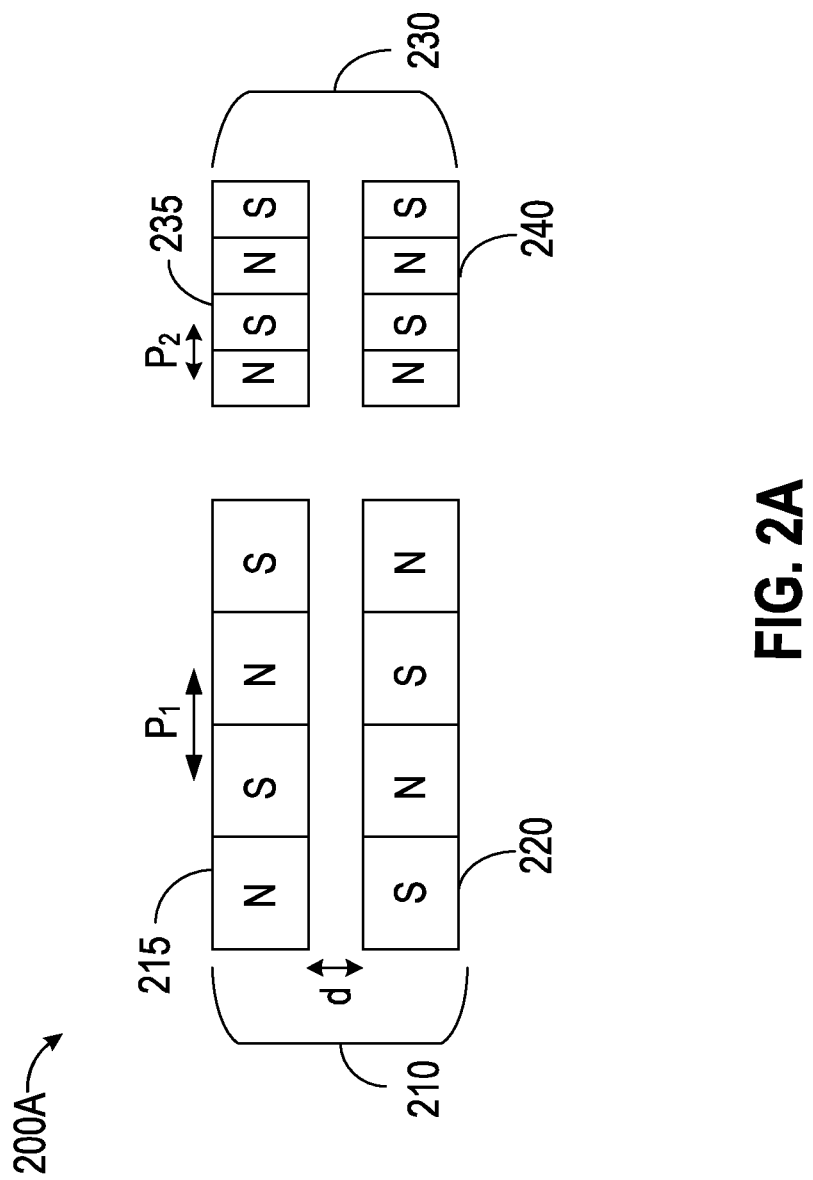

MAGNETIC CLOSURE SYSTEM FOR A DEVICE

TECHNICAL FIELD

This disclosure relates generally to closure magnets for an electronic device and, more particularly, to a system and method of leveling a curve of a magnetic closure force for keeping a device in a closed position.

BACKGROUND

Many computer users utilize screen guards for their electronic devices to protect the screen from accidental damages and scratches (e.g., a screen protector) or to provide privacy by limiting the viewing angle from which the screen can be viewed (e.g., by using a privacy film). Such screen guards are often made from a film that can be removably attached to a screen. For electronic devices such as laptops, foldable mobile phones, foldable tablets, or devices that use a foldable cover, the presence of the screen guard may increase the distance between the two portions of the device when it is in a closed (e.g., folded) position. Because it is often important for such devices to remain closed after they have been placed in a closed position, a closure mechanism may be used to keep the devices in their closed position. The presence of a screen guard, however, may adversely affect the closure mechanism.

To compensate for this, some devices utilize mechanisms that provide an increased closure force. This, however, may result in an increase in the amount of force required to open the device, particularly, when a screen guard is not in use. This increase in force often means that the user has to use more effort (e.g., has to use both hands instead of just one) and focus to open their device. Moreover, the increased force may make the device less accessible to persons with physical disabilities.

SUMMARY

Apparatuses and methods of a closure structure for an electronic device are described. In one general aspect, the instant disclosure presents an electronic device which includes a first portion, a second portion, a connecting element pivotally connecting the first portion to the second portion and configured to enable the electronic device to fold between a closed position and an open position, and a magnetic element for providing a closure force to bias the electronic device in the closed position. In some implementations, the magnetic element includes a first magnet pair and a second magnet pair, each of the first magnet pair and second magnet pair including a first magnet housed within the first portion and a second magnet housed within the second portion, the first magnet pair provides an attractive magnetic force that biases the electronic device in the closed position, the second magnet pair provides a repelling magnetic force that partially counteracts the biasing from the attractive magnetic force as a gap between the first portion and the second portion decreases, and a pole size of the second magnet pair is smaller than a pole size of the first magnet pair.

In another general aspect, the instant application describes a method for manufacturing a magnetic closure system for an electronic device. The method may include providing a magnetic material, forming a first magnet array from the magnetic material; and forming a second magnet array from the magnetic material, where each of the first magnet array and the second magnet array include a first magnet and a second magnet, the first magnet of the first magnet array and the first magnet of the second magnet array are configured to provide an attractive magnetic force that biases the electronic device in the closed position, the second magnet of the first magnet array and the second magnet of the second magnet array are configured to provide a repelling magnetic force that partially counteracts the biasing from the attractive magnetic force as a gap between a first portion and a second portion of the electronic device decreases, and a pole size of the second magnet of the first magnet array and the second magnet of the second magnet array are is selected such that the pole size is smaller than a pole size of the first magnet of the first magnet array and the first magnet of the second magnet array.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 1A depicts a side-view schematic representation of an electronic device that includes a magnetic closure system.

FIGS. 2A-2B depict simplified schematic representations of magnetic closure systems for use in an electronic device.

DETAILED DESCRIPTION

Figure 1B:
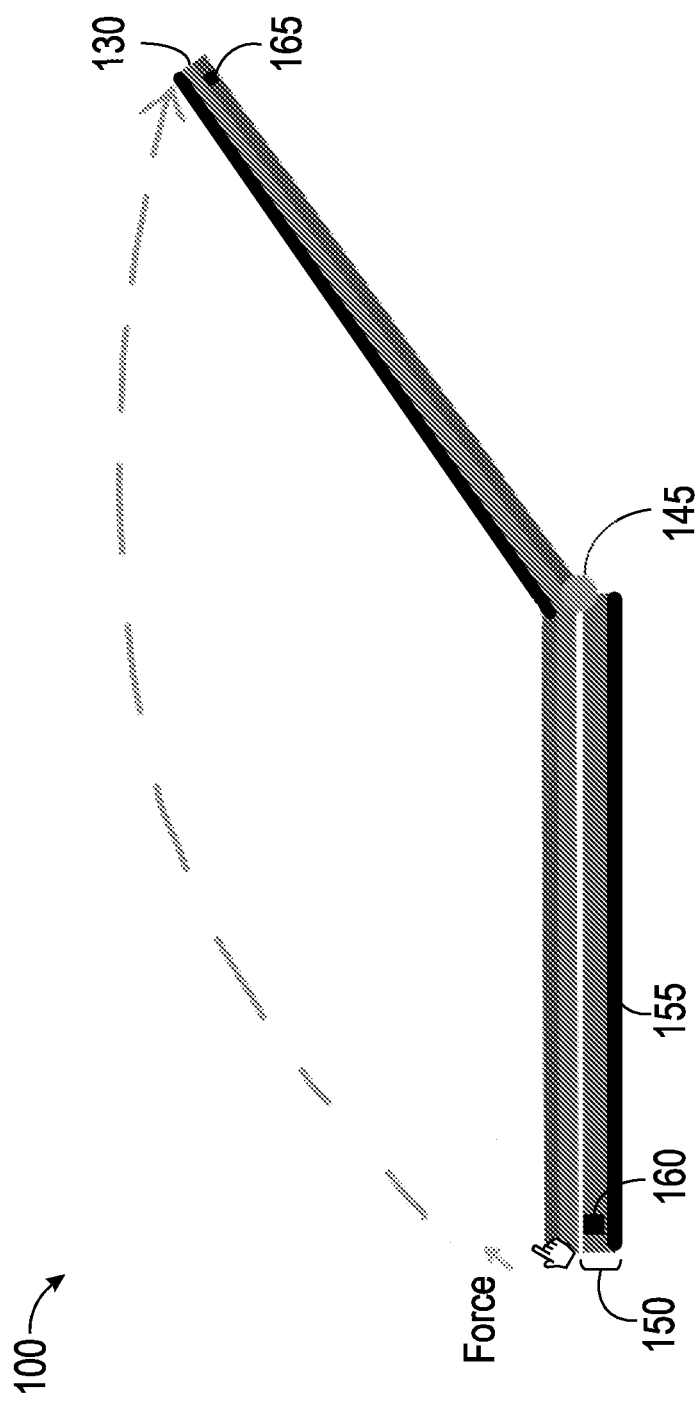
FIG. 1B depicts an alternative side-view schematic representation of the electronic device of FIG. 1A.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings Many of today's personal computer devices include foldable elements. Such devices include laptops having a display element and a base, devices having two display elements (e.g., dual screen laptops), foldable tablets, foldable mobile phones, and devices that are not foldable themselves but utilize a foldable case. Users often fold their devices to put them in a closed position when the devices are not in use. This may be done to prevent damage to the device, to enable easy transportation, and the like. Once the device is placed in a closed position, it is often important to the user that the device remains in the closed position until the user decides to open the device again. Additionally, to increase accessibility and user convenience, some electronic devices utilize a one-finger open mechanism that ensures the device can be fully opened using only one finger (e.g., it does not require the use of one hand for holding the device and another for opening it). Therefore, it is important to balance the need for a sufficient closure force (e.g., a magnetic closure force) for the device to keep it closed with the need for an open mechanism that is user accessible.

To balance the need for ensuring that the device remains closed but also provide a low effort opening experience, some devices utilize a magnetic closure mechanism that involves the use of magnetic elements. The magnetic elements may be selected such that they provide an amount of attractive force that is sufficient to maintain the device in a closed position and also minimize difficulty opening the device.

Moreover, many users may choose to apply a screen guard to their devices to protect the display element, protect one or more other elements of the device (e.g., a keyboard cover), and/or protect the user's privacy. The term screen guard as used here may refer to any protective film used to protect an element of an electronic device and/or protect user privacy. A screen guard positioned between the two foldable elements may increase the distance between the foldable elements when the device is in the closed position. This in turn affects the amount of magnetic force required to keep the device closed and the amount of force required to open the device. Therefore, a closure mechanism that is not adapted for use with and without a screen guard may not function properly for all users.

To address these problems and more, a solution is provided that includes utilizing a magnetic closure system which includes two pairs of magnets. In some implementations, each pair includes one magnet housed within a first portion of the device and another magnet housed within a second portion of the device. The first pair of magnets provides an attractive magnetic force that biases the device in the closed position, while the second pair of magnets provides a repelling magnetic force that partially counteracts the attractive magnetic force of the first pair as a distance between the first portion and the second portion decreases. The pole size of the second pair of magnets may be smaller than the pole size of the first pair of magnets so that a curve of the closure force over distance levels off as the device is closed. The resulting magnetic closure mechanism operates to keep the device in the closed position with or without a screen guard, while also providing an accessible opening experience for the user.

As will be understood by persons of skill in the art upon reading this disclosure, benefits and advantages provided by such implementations can include, but are not limited to, a solution to the technical problem of providing a closure mechanism for a foldable device that both keeps the device closed when in the closed position and provides an accessible, hassle-free opening experience, regardless of whether a screen guard is used. Moreover, the closure systems are simple and inexpensive to manufacture and implement, thus saving design and production costs.

Referring now to the drawings, FIG. 1A depicts a side-view schematic representation of an electronic device 100 that includes a magnetic closure system. In some implementations, the device 100 is a foldable personal computer having an open and a closed configuration. Examples of suitable electronic devices include but are not limited to single-screen laptops, dual-screen laptops, foldable tablets, foldable mobile phones, and non-foldable electronic devices that are used with a foldable case. In the example of FIG. 1A, device 100 is a single-screen laptop having a top portion 130 that is movably connected to a bottom portion 150. The top portion 130 may include an external casing 135 and a display screen 120. The external casing 135 may provide a housing for the display screen 120 and various other components that may be included in the top portion 130 of the device 100.

The bottom portion 150 may include a keyboard on the top surface. In some implementations, the bottom portion 150 includes an external casing 155 with an internal volume for housing various components. Each of the external casings 135 or 155 may be formed from materials such as metals, plastics, or polymers. The bottom portion 150 may be movably connected to the top portion 130 via a connecting element 145. In an example, the connecting element 145 includes one or more hinges. The connecting element 145 may enable the top portion 130 to pivot with respect to the bottom portion 150 to provide multiple modes. For example, the connecting element 145 may allow the top portion 130 to be moved from a vertical open position to a horizontal closed position and vice versa. In the closed position, the top portion 130 may be positioned adjacent to the bottom portion 150.

To bias the top portion to remain firmly in place during the closed position, the device 100 may include magnetic elements. The magnetic elements may include a top magnetic element 165 housed within the top portion 130 and a bottom magnetic element 160 which is housed within the bottom portion 150. The magnetic elements may be positioned anywhere within the top portion 130 and the bottom portion 150, as long as they are able to provide sufficient magnetic forces to maintain the device in the closed position. The magnetic elements may provide both an attractive magnetic force and a repulsive magnetic force that partially counteracts the attractive magnetic force, as discussed further below.

In some implementations, the device 100 includes a screen guard 140 which may be attached to the display screen 120. The screen guard 140 may include a thin protective membrane which attaches directly or indirectly to the display screen 120 (or to a keyboard or other element of the device) to protect the screen (or any other element to which it is attached) from damage and/or provide privacy (e.g., privacy films). It should be noted that, in some implementations, privacy films are thicker than screen protectors and the term screen guard as used herein includes screen protectors, keyboard protectors and privacy films. In some implementations, the screen guard 140 is composed of glass or acrylic and provides high transparency. Because the screen guard is attached to the display screen 120, it is located between the top portion 130 and the bottom portion 150 when the device is in the closed configuration. This may increase the distance between the top magnetic element 165 and the bottom magnetic element 160 in the closed position and as such may affect the strength of the magnetic force between the two elements. Increasing the distance affects the amount of attractive magnetic forces required to keep the device 100 in the closed position and the amount of force required to open the device 100.

FIG. 1B depicts an alternative side-view schematic representation of the device 100 as it is being opened. When a user desires to begin operating the device 100, and the device 100 is in a closed position (e.g., the top element 130 is positioned adjacent to the bottom portion 150), the user may exert a force to the top element 130 in the vertical direction (e.g., the z direction) to open the device 100. The force applied to the top element 130 may apply a rotational force or torque about the connecting element 145 which moves the top element 130 away from the bottom portion 150. The amount of force required to move the top element 130 to a desired upright position from the closed position may vary for devices of various sizes and weights and may depend in part on the attractive magnetic forces that bias the device 100 in the closed position. In some implementations, the pair of magnetic elements are designed such that the device 100 can be opened using only one hand or only one finger. As used herein, the amount of force required to achieve a one-finger open operation from a closed position to an open position is 10 Newtons or less. In some implementations, the amount of opening force for a one-finger open operation is 4 Newtons or less to further improve user accessibility. In some circumstances, the amount of force required to maintain the device in the closed position is 1 Newton or more. In some circumstances the amount of force required to maintain the device in the closed position is 2 Newtons or more. Thus, in some implementations, the magnetic forces provided by the magnetic elements produce a total magnetic force while in the closed position that enables the device 100 to be opened with a user force of between 2 Newtons and 10 Newtons.

To achieve this, the magnetic elements may be configured to provide both an attractive magnetic force and a repulsive magnetic force that partially counteracts the attractive magnetic force at short distances (e.g., partially counteracts the attractive force at distances on the order of a thickness of a screen guard). In some implementations, this is achieved by utilizing two sets of magnets (e.g., an attractive set and a repulsive set) as depicted in the magnetic closure systems of FIGS. 2A-2B. The magnetic closure system 200A illustrated in FIG. 2A includes a first set of magnets 210 and a second set of magnets 230.

The first set of magnets 210 includes a top magnet 215 which may be housed in the top element of an electronic device (e.g., top element 130 of device 100) and a bottom magnet 220 which may be housed in the bottom element of the electronic device (e.g., the bottom element 150 of device 100). The combination of the top magnet 215 and the bottom magnet 220 forms a set of magnets having an attractive magnetic force between them. That is because the set of magnets 210 are arranged such that when the device is in the closed position, opposite poles are adjacent to one another, thus generating an attractive magnetic force that biases the device in the closed position.

In contrast, the top magnet 235 and the bottom magnet 240 which form the second set of magnets 230 are arranged such that like poles are adjacent to one another when the device is in the closed positioned. Similar to the top magnet 215, the top magnet 235 of the second set may also be housed in the top element of the electronic device (e.g., top element 130 of device 100) and the bottom magnet 240 may be housed in the bottom element of the electronic device (e.g., the bottom element 150 of device 100). As a result, when the device is in the closed position, the second pair of magnets 230 provide a repulsive force that partially counteracts the attractive force of the first pair of magnets 210.

The extent of the magnetic flux of a set of magnets is based on the pole size of the magnets. As depicted in the magnetic closure system 200A, the pole size $P_1$ of the first pair of magnets 210 may be the distance from the middle point of each magnetic element having one polarity (e.g., the south polarity) to the middle point of the next magnetic element having an alternating polarity (e.g., the north polarity). Similarly, the pole size $P_2$ of the second pair of magnets 230 may be the distance from the middle point of each magnetic element having one polarity (e.g., the north polarity) to the middle point of the next magnetic element having an alternating polarity (e.g., the south polarity). In some implementations, the pole size, $P_2$, of the second pair of magnets 230 is selected such that it is smaller than the pole size, $P_1$, of the first pair of magnets 210. Thus, in those implementations, the first set of magnets 210 have a magnetic flux that extends further than the magnetic flux of the second set of magnets 230. In some implementations, the pole size $P_2$ is substantially the same as a closure distance, d, between the magnets 235 and 240 in the presence of a screen guard. For example, the pole size $P_2$ is between 0.5 and 1.5 times the distance, d, when a screen guard is positioned between the magnets 235 and 240. In this way when the closure distance, d, is larger due to the presence of a screen guard, the attractive magnets 215 and 220 exert less attractive magnetic force to keep the device closed. However, because of the increased distance, the repulsive magnetic force between the top magnet 235 and the bottom magnet 240 is also reduced, and thus does not have as much of a counteractive influence on the attractive magnetic forces. As a result, in the presence of a screen guard which increases the distance (e.g., the gap size between the top element and the bottom element of the device in the closed position), the total magnetic force may be substantially equal to the attractive magnetic force between the first set 210 (e.g., the total magnetic force is within 10% or 5% of the attractive magnetic force). In this way, the magnets 215 and 220 can be selected and positioned such that when a screen guard is present, their attractive magnetic force biases the device in the closed position, while providing a hassle-free opening experience (e.g., bias the device to require a user force of between 2 N and 10 N to open the device).

For devices that do not include a screen guard, the gap size d may be smaller, thus causing the magnets 235 and 240 to be closer to each other in the closed position. The closer distance causes the second set of magnets to exert more repulsive magnetic force when the device is closed. In this case, the second set of magnets 230 provide a repulsive magnetic force that partially counteracts the attractive magnetic force of the first set of magnets 210. In this way, the magnets 235 and 240 can be selected and positioned such that, when a screen guard is not present, their repulsive magnetic force partially counteracts the attractive force of the first set of magnets 210 so that the total magnet force is substantially equal to the total magnet force in the presence of the screen guard (e.g., within 20%, 10%, or 5%). This ensures that, in the absence of a screen guard, the attractive magnetic force provided by the magnetic closure system 200A is sufficient to bias the device in the closed position, but it is not too strong as to prevent an easy opening experience (e.g., a one-finger open experience).

In some implementations, the pole size $P_2$ is selected such that it is in the range of 0.5 to 1.5 times the gap size d (a gap size with a screen guard present), while the pole size $P_1$ is selected to be larger than 1.5 times the gap size d. In some implementations, the pole size $P_2$ may be selected such that in the closed position, with the screen guard being between the top portion and the bottom portion, the closure force of the device is within 1 Newton of the closure force of the device while in the closed position without the screen guard.

It should be noted that although the magnets 215, 220, 235 and 240 are depicted as magnetic arrays, other types of magnetic systems may be used to achieve the same results.

In some implementations, one or more portions of the first set of magnets may be replaced by an object made from high ferrous grade steel. In such implementations, the high ferrous grade steel in combination with one or more magnets produces the required magnetic attraction force. In an example, 400 series stainless steel (e.g., SUS 430) is used instead of any of the magnets 215, 220, 235 and 240. In another example, bar magnets or solenoids are utilized.

Figure 2B:
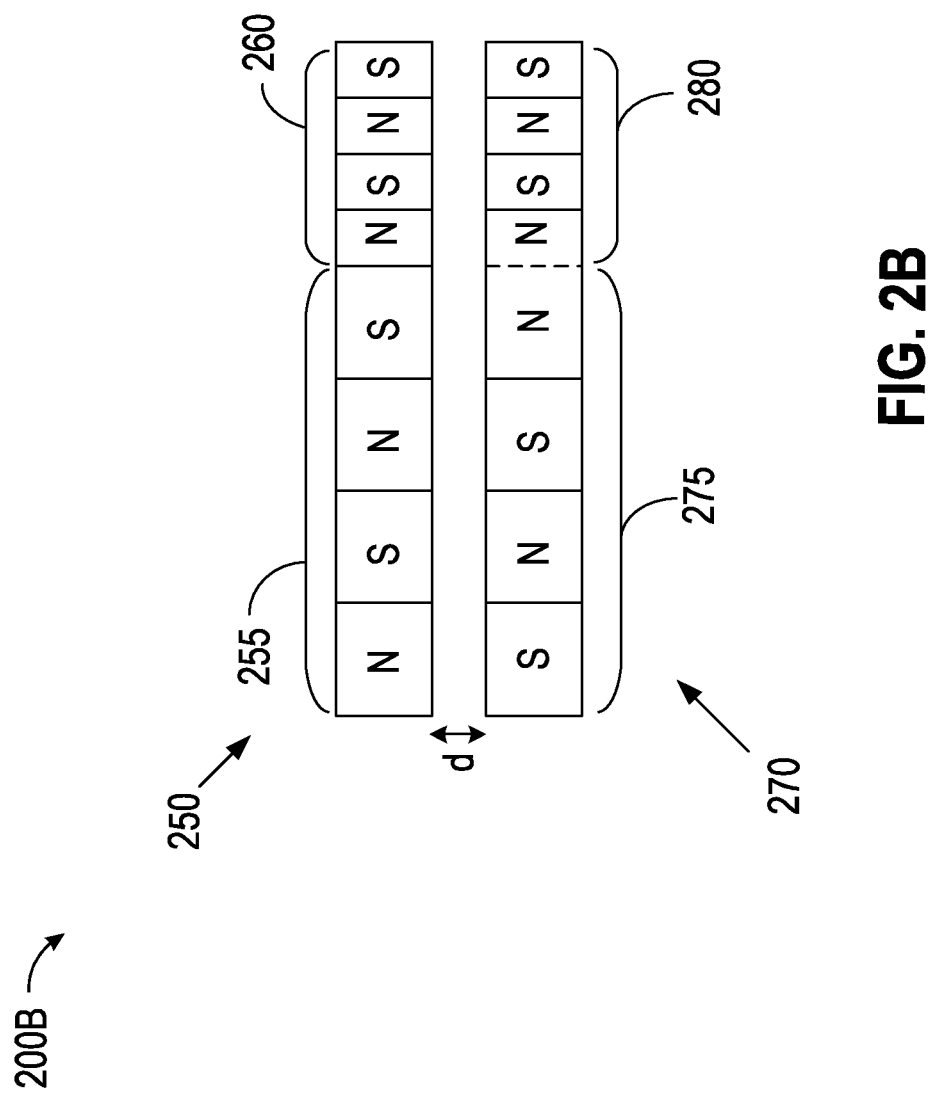

Furthermore, although two separate magnet arrays are displayed for the magnets 215 and 235 and magnets 220 and 240, other configurations are also possible. FIG. 2B provides an alternative implementation for a magnetic closure system. In the magnetic closure system 200B of FIG. 2B, the attractive and repulsive magnets are incorporated into the same magnet array. Thus, the magnetic closure system 200B provides one pair of magnets that includes a first magnet array 250 and a second magnet array 270. The first magnet array 250 includes a first portion 255 and a second portion 260, while the second magnet array 270 includes a first portion 275 and a second portion 280. The first portions 255 and 275 generate an attractive magnetic force, while the second portions 260 and 280 create a repulsive magnetic force. The magnet pair 250 and 270 operate in a similar manner as the two pairs of magnets of the magnetic system 200A to provide a closure system that functions as desired with and without a screen guard.

Figure 3A:
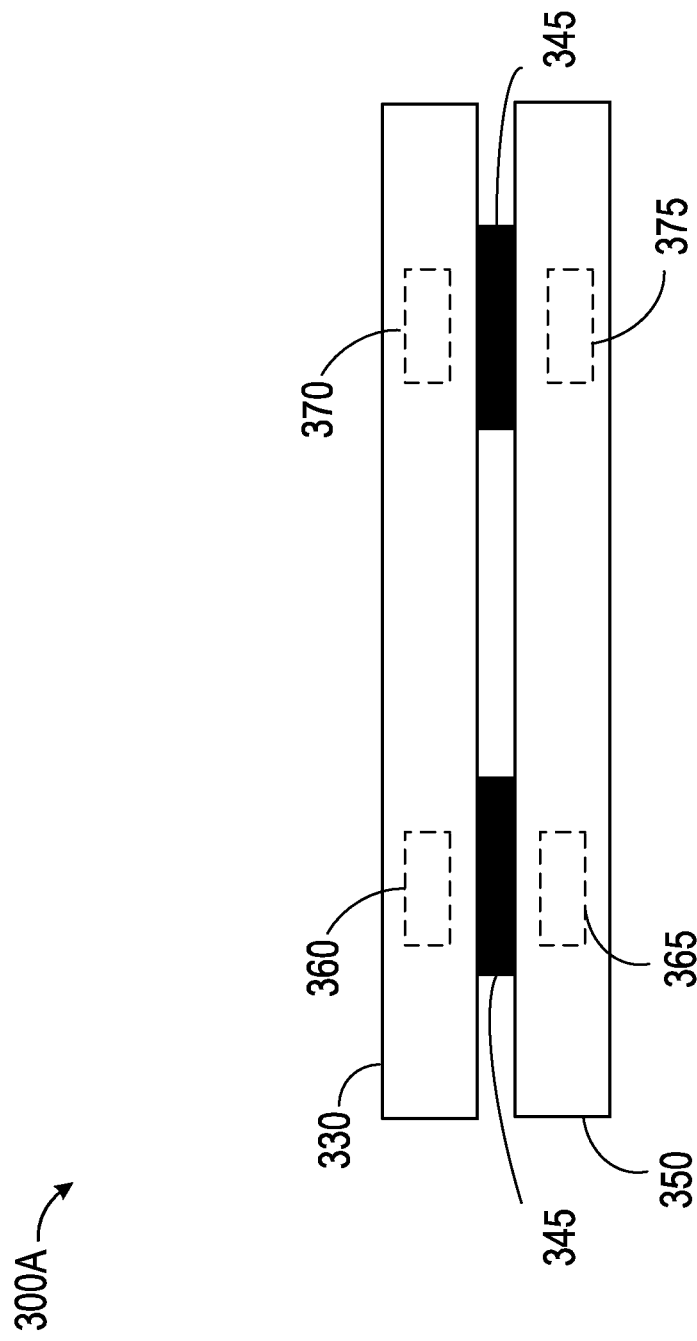
FIGS. 3A-3B depict front-views of a simplified schematic representation of an electronic device, in a closed position.

FIG. 3A depicts a front-view of a simplified schematic representation of an electronic device 300A, in a closed position. The electronic device 300A may include a top portion 330 movably connected to a bottom portion 350 via a connecting element 345. The elements of the electronic device 300A may be similar to and may function in a similar manner as the elements of the device 100 of FIGS. 1A-1B and as such are not discussed in detail herein.

The electronic device 300A may include two sets of magnets. The first set may include a top magnet 360 housed in the top portion 330 and a bottom magnet 365 housed in the bottom portion 350. Similarly, the second set may include a top magnet 370 housed in the top portion 330 and a bottom portion 375 housed in the bottom portion 350. In some implementations, the first set may include attractive magnets that generate an attractive magnetic force to maintain the device closed in the closed position, while the second set provides a repulsive magnetic force that balances the attractive magnetic force when the distance between the top portion 330 and the bottom portion 350 falls below a predetermined threshold. As discussed above, the predetermined threshold may be equal to the pole size of the magnets 370 and 375 and may be based on a thickness of a screen guard. In some alternative implementations, the first set includes repulsive magnets, while the second set includes attractive magnets.

It should be noted that although the magnets in the first set and the magnets in the second set are being shown as being located the same linear distance from the connecting element 345, they may be positioned in various different locations of the electronic device 300A. Moreover, the top magnet 360 and the bottom magnet 365 (and similarly the top magnet 370 and the bottom magnet 375) may not always be housed within the top portion and the bottom portion such that they align when the device is in the closed position. Depending on the design parameters and the needs of the electronic device, the magnets may be designed such that they partially align or that they have a large enough magnetic pole to generate a magnetic force even if they are not completely aligned. As such, the magnets may be positioned anywhere within the top element and/or the bottom elements of the device.

Figure 3B:
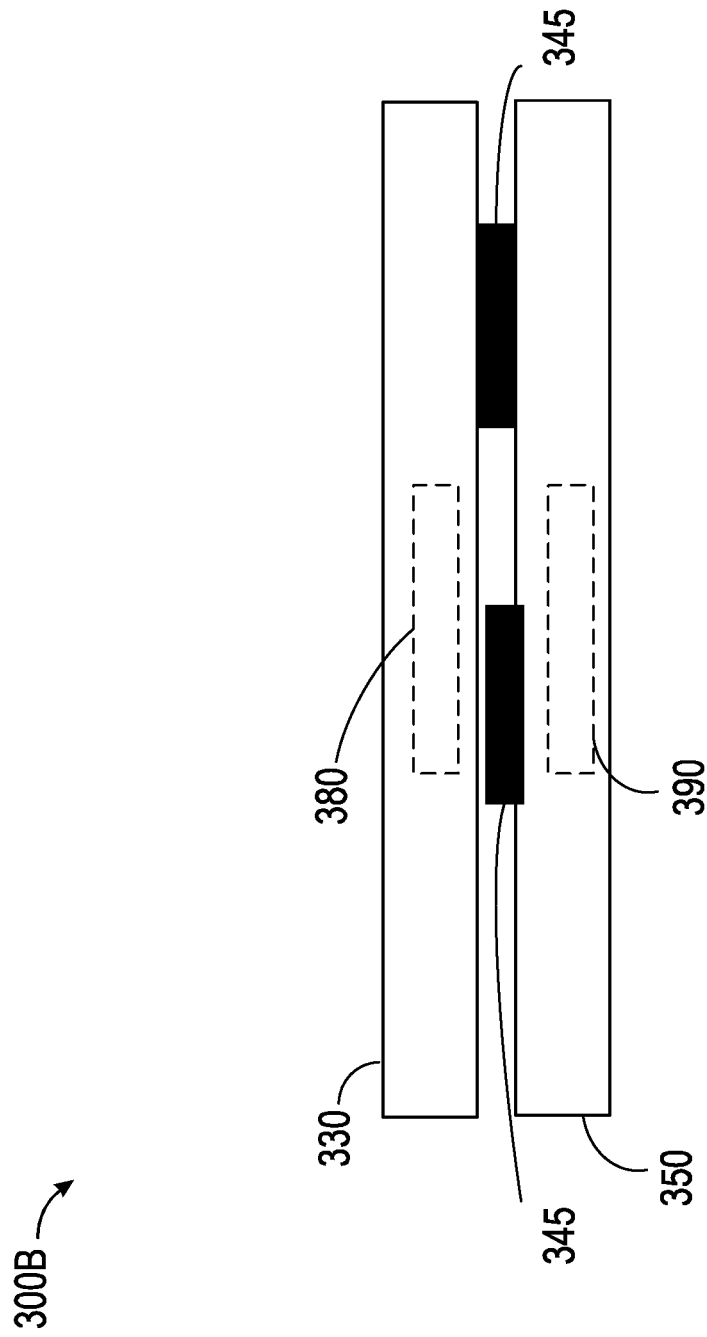

FIG. 3B depicts a front-view of a simplified schematic representation of an electronic device 300B, having an alternative implementation. Similar to the electronic device 300A, the electronic device 300B may include a top portion 330 movably connected to a bottom portion 350 via a connecting element 345. However, instead of having two separate magnets in the top portion 330 and two separate magnets in the bottom portion 350, the electronic device 300B includes one magnet array 380 in the top portion and one magnet array 390 in the bottom portion. As discussed above, each of the magnet array 380 and the magnet array 390 may include attractive and repulsive portions such that they provide a similar balancing magnetic system as that of the electronic device 300A. In yet other alternative implementations, two or more magnet arrays are provided for each of the attracting and/or repulsive sets of magnets.

Figure 4:
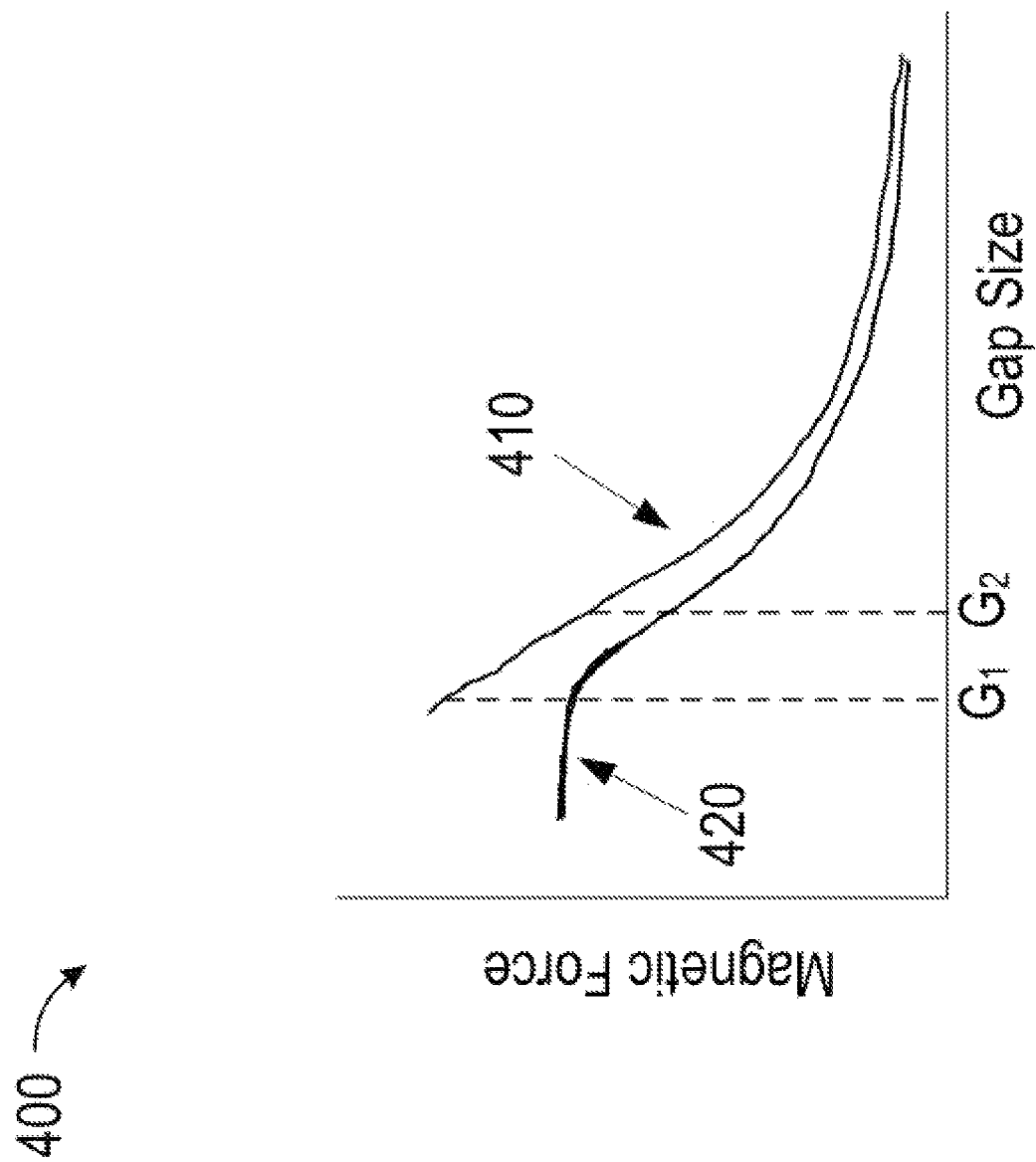
FIG. 4 depicts a diagram of variations in the magnetic force as the gap size between the top element and the bottom element of the electronic device changes.

FIG. 4 depicts a diagram of variations in the magnetic force as the gap size between the top element and the bottom element of the electronic device changes. The graph 400 of FIG. 4 includes two lines 410 and 420. The top line 410 illustrates an example of a magnetic force curve when only attractive magnets are used in the closure magnetic system. In such an instance, the magnetic force is inversely proportional to the gap size between the top element and the bottom element. This is because as the gap size increases, the distance between the attractive magnets also increases, thereby decreasing their magnetic force. $G_1$ depicts an example gap size between the top and bottom elements of the electronic device when a screen guard is not used, while $G_2$ depicts an example gap size when the screen guard is used. As shown in FIG. 4, as the gap size decreases the rate of change in magnetic force increases. Thus, when the attractive magnets are designed such that they provide sufficient magnetic force in the presence of the screen guard, the resulting magnetic force may become too strong when a screen guard is not used. This may result in the magnetic force interfering with the user's ability to easily open the device when the gap size becomes small (e.g., in the absence of screen guard). Conversely, when the attractive magnets are designed such that they provide low enough magnetic force to enable a one-finger open experience without a screen guard present, the resulting magnetic force may be too weak to maintain the device in a closed position when a screen guard is used.

The lower line 420 depicts variations in the magnetic force, when both the first set of attractive magnets and the second set of repulsive magnets are utilized in the magnetic closure system, as disclosed herein. As depicted, the use of the repulsive magnets has minimal affect when the gap size is large. However, as the gap size decreases, the repulsive magnets begin to counteract the magnetic force of the attractive magnets. As a result, the overall curve begins to level, or flatten, as the gap size decreases. This ensures that large enough attractive magnets can be used to bias the device in the closed position, when a screen guard is used, while at the same time, ensuring that the device can be opened easily with the use of one finger, even when no screen guard is present. This provides an easy-to-implement and efficient closure mechanism that functions well with and without the use of a screen guard.

Figure 5:
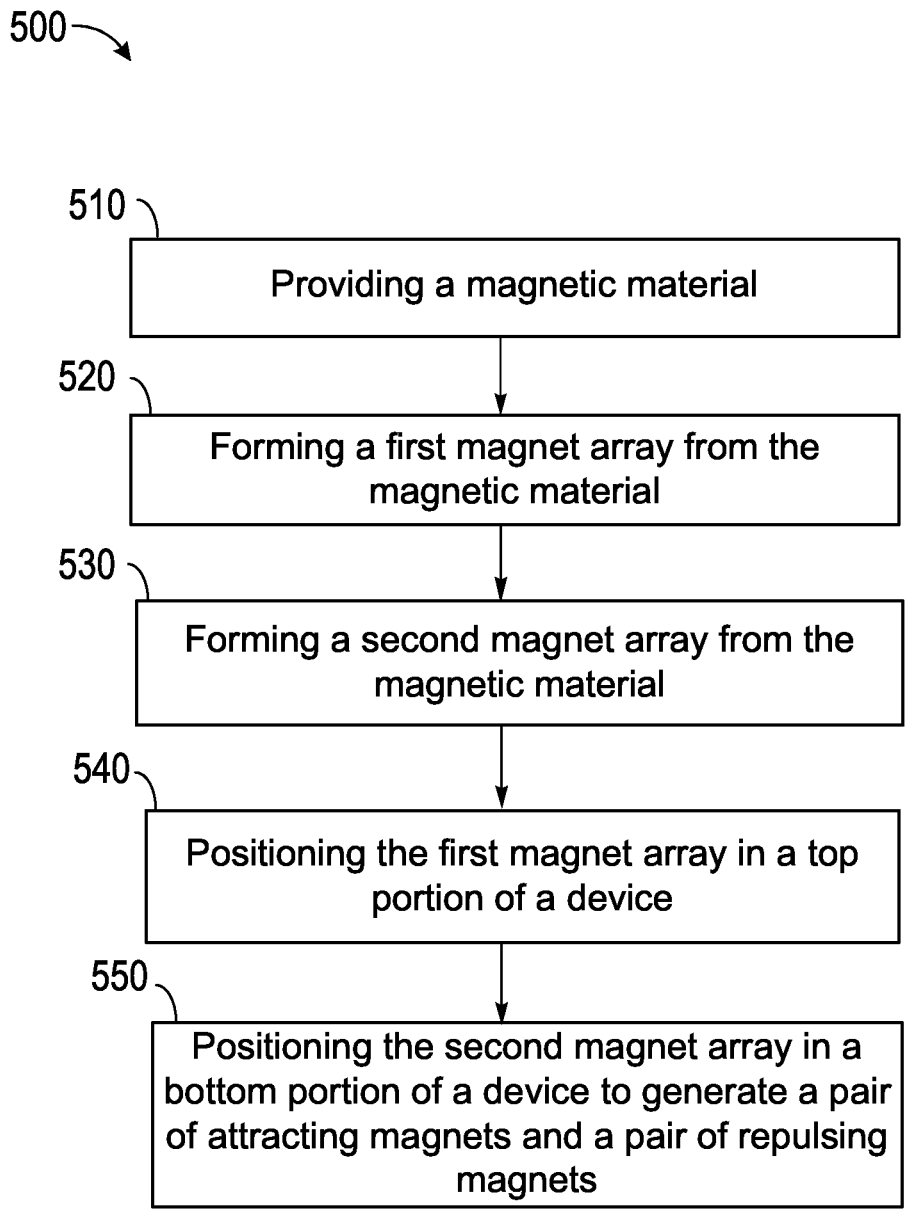
FIG. 5 is a flow diagram for a method for manufacturing a magnetic closure system for an electronic device.

FIG. 5 is a flow diagram depicting an example method 500 for manufacturing a magnetic closure system for an electronic device, such as the device 100 of FIGS. 1A-1B and the devices 300A/300B of FIGS. 3A-3B. At 510, the method 500 may begin by providing a magnetic material for the magnetic closure system. In some implementations, the magnetic material includes one or more magnet arrays having an alternating north and south pattern. Alternatively, the magnetic material may include magnet bars, solenoids, objects made from high ferrous grade steel, or any other material that can efficiently provide attractive and/or repulsive magnetic forces.

Once the magnetic material is provided, method 500 may proceed to form a first magnet array from the magnetic material, at 520. The first magnet array may include a first portion and a second portion. The pole sizes of the magnet arrays in the first portion may be selected such that they are larger than the pole sizes of the magnet arrays in the second portion. In some implementations, the first portion and the second portion are connected to each other. Alternatively, the first portion and the second portion may be two separate magnet arrays. In some implementations, the pole sizes of the first portion are selected such that when faced with a magnet array of opposing polarity, they provide a sufficient amount of magnetic force to bias the device in the closed position irrespective of whether a screen guard is used or not. The pole sizes of the second portion, on the other hand, may be selected such that they are approximately equal to the gap size between the two portions of the device, in the absence of a screen guard, when the device is in a closed position.

After forming the first magnet array, method 500 may proceed to form a second magnet array from the magnetic material, at 530. The second magnet array may also include a first portion and a second portion. The pole sizes of the magnet arrays in the first portion may be selected such that they are larger than the pole sizes of the magnet arrays in the second portion. Similar to the first magnet array, the first portion and the second portion of the second magnet array may be connected to each other. Alternatively, the first portion and the second portion may be two separate magnet arrays. In some implementations, the pole sizes for the first portion of the second magnet array are selected such that they are approximately the same size as the pole sizes of the first portion of the first magnet array. Similarly, the pole sizes of the second portion of the second magnet array may be selected such that they are approximately the same size as the pole sizes of the second portion of the first magnet array. However, the poles on the first portion of the second magnet array may be arranged such that they face opposing poles on the first portion of the first magnet array. The poles on the second portion of the second magnet array, on other hand, may be selected such that they face poles having the same polarity.

Once both the first and the second magnet arrays are formed, method 500 may proceed to position the first magnet array in a top portion of the device, at 540, before proceeding to position the second magnet array in a bottom portion of the device, at 550. The first magnet array and the second magnet array may be positioned anywhere within the top portion and the bottom portion of the device, as long as they provide sufficient magnetic forces to bias the device in a closed position, when desired, and provide an easy opening experience, when needed. It should be noted that although the closure mechanism discussed herein has been described as being applied in a device having a top and a bottom portion, the disclosed closure mechanism would work equally well for devices having other configurations such as left/right portions. In a device having a left/right configuration, the first magnet array may be positioned within the left portion, while the second magnet array may be housed within the right portion.

Apparatuses and methods of providing a magnetic closure system for an electronic device are disclosed. In some implementations, the magnetic closure system provides one or more sets of attracting magnets and one or more sets of repulsing magnets that counteract at least some of the attractive magnetic forces of the attracting magnets, when a gap size between the magnets falls below a threshold. As a result, the magnetic closure system may provide a balance between the attractive closure magnetic forces required to bias the device in the closed position in the presence of a screen guard, and a desire to use a small amount of force to open the device, in the absence of the screen guard. The resulting balance provides the desired results regardless of the manner in which the user chooses to utilize their device (e.g., with or without a screen guard), thus providing flexibility and convenience of use for users. This provides a simple inexpensive mechanism for providing a magnetic closure system that functions well under different circumstances, and is easy and inexpensive to manufacture and incorporate into an electronic device.

In the following, further features, characteristics and advantages of the invention will be described by means of items:

Item 1. An electronic device comprising:
a first portion;
a second portion;
a connecting element pivotally connecting the first portion to the second portion and configured to enable the electronic device to fold between a closed position and an open position; and
a magnetic element for providing a closure force to bias the electronic device in the closed position,
wherein:
the magnetic element includes a first magnet pair and a second magnet pair, each of the first magnet pair and the second magnet pair including a first magnet housed within the first portion and a second magnet housed within the second portion,
the first magnet pair provides an attractive magnetic force that biases the electronic device in the closed position,
the second magnet pair provides a repelling magnetic force that partially counteracts the biasing from the attractive magnetic force as a gap between the first portion and the second portion decreases, and
a pole size of the second magnet pair is smaller than a pole size of the first magnet pair.

Item 2. The electronic device of item 1, wherein the first portion includes a first magnet array and the first magnet array includes respective first magnets of the first and second magnet pairs.

Item 3. The electronic device of item 2, wherein the first magnet array includes:
a first array of magnets having alternating patterns of north polarities and south polarities for the first magnet of the first magnet pair, and
a second array of magnets having alternating patterns of north polarities and south polarities for the second magnet pair.

Item 4. The electronic device of any one of the preceding items, wherein the first portion includes a first magnet array and a second magnet array, the first magnet array includes the first magnet of the first magnet pair, and the second magnet array includes the first magnet of the second magnet pair.

Item 5. The electronic device of any one of the preceding items, wherein a pole size of the second magnet pair is between 0.5 times and 1.5 times a gap size between the first and second magnet in the second magnet pair while the electronic device is in the closed position.

Item 6. The electronic device of any one of the preceding items, wherein the electronic device has a closure force between 2 Newtons and 10 Newtons while in the closed position, and the closure force comprises the attractive magnetic force of the first pair of magnets and the repelling magnetic force of the second pair of magnets.

Item 7. The electronic device of any one of the preceding items, further comprising a screen guard removably connectable to a display portion of the first portion, the screen guard being configured so that it is positionable between the first portion and the second portion when the electronic device is in the closed position.

Item 8. The electronic device of item 7, wherein a closure force of the electronic device while in the closed position with the screen guard between the first portion and the second portion is within 1 Newton of a closure force of the electronic device while in the closed position without the screen guard between the first portion and the second portion.

Item 9. The electronic device of any one of the preceding items, wherein the first magnet pair and the second magnet pair are configured so that a closure force may be overcome and the electronic device folded into the open position by use of one finger.

Item 10. The electronic device of any one of the preceding items, wherein the first portion includes a display element and the second portion includes a keyboard.

Item 11. The electronic device of any one of the preceding items, wherein the first portion includes a first display element and the second portion includes a second display element.

Item 12. The electronic device of any one of the preceding items, wherein the first portion is a first portion of a foldable display and the second portion is a second portion of the foldable display.

Item 13. A method of manufacturing a magnetic closure system for an electronic device comprising:
  providing a magnetic material;
  forming a first magnet array from the magnetic material; and
  forming a second magnet array from the magnetic material;
  wherein:
    each of the first magnet array and the second magnet array include a first magnet and a second magnet,
    the first magnet of the first magnet array and the first magnet of the second magnet array are configured to provide an attractive magnetic force that biases the electronic device in the closed position,
    the second magnet of the first magnet array and the second magnet of the second magnet array are configured to provide a repelling magnetic force that partially counteracts the biasing from the attractive magnetic force as a gap between a first portion and a second portion of the electronic device decreases, and
    a pole size of the second magnet of the first magnet array and the second magnet of the second magnet array are selected such that the pole size is smaller than a pole size of the first magnet of the first magnet array and the first magnet of the second magnet array.

Item 14. The method of manufacturing of item 13, further comprising:
  positioning the first magnet array in the first portion of the electronic device; and
  positioning the second magnet array in the second portion of the electronic device.

Item 15. The method of manufacturing of any one of items 13 or 14, wherein the first magnet array includes:
  a first array of magnets having alternating patterns of north polarities and south polarities for the first magnet of the first magnet array, and
  a second array of magnets having alternating patterns of north polarities and south polarities for the second magnet of the first magnet array.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. An electronic device comprising:
    a first portion;
    a second portion;
    a connecting element pivotally connecting the first portion to the second portion and configured to enable the electronic device to fold between a closed position and an open position; and
    a magnetic element for providing a closure force to bias the electronic device in the closed position,
    wherein:
        the magnetic element includes a first magnet pair and a second magnet pair, each of the first magnet pair and the second magnet pair including a first magnet housed within the first portion and a second magnet housed within the second portion,
        the first magnet pair provides an attractive magnetic force that biases the electronic device in the closed position,
        the second magnet pair provides a repelling magnetic force that partially counteracts the biasing from the attractive magnetic force as a gap between the first portion and the second portion decreases,
        the first portion includes a first magnet array and a second magnet array, the first magnet array including a first set of magnetic elements that form the first magnet of the first magnet pair, and the second magnet array including a second set of magnetic elements that form the first magnet of the second magnet pair;
        a pole size of a set of magnetic elements is the distance from the middle point of a magnetic element in the set having one polarity to the middle point of the next magnetic element in the set having an alternate polarity; and
        a pole size of the second set of magnetic elements is smaller than a pole size of the first set of magnetic elements.

2. The electronic device of claim 1, wherein the first set of magnetic elements and second set of magnetic elements form a magnet array.

3. The electronic device of claim 2, wherein the first set of magnetic elements or the second set of magnetic elements have alternating patterns of north polarities and south polarities.

4. The electronic device of claim 1, wherein the pole size of the second set of magnetic elements magnet is between 0.5 times and 1.5 times a gap size between the first and second magnet in the second magnet pair while the electronic device is in the closed position.

5. The electronic device of claim 1, wherein the electronic device has a closure force between 2 Newtons and 10 Newtons while in the closed position, and the closure force comprises the attractive magnetic force of the first pair of magnets and the repelling magnetic force of the second pair of magnets.

6. The electronic device of claim 1, further comprising a screen guard removably connectable to a display portion of the first portion, the screen guard being configured so that it is positionable between the first portion and the second portion when the electronic device is in the closed position.

7. The electronic device of claim 6, wherein a closure force of the electronic device while in the closed position with the screen guard between the first portion and the second portion is within 1 Newton of a closure force of the electronic device while in the closed position without the screen guard between the first portion and the second portion.

8. The electronic device of claim 1, wherein the first magnet pair and the second magnet pair are configured so that a closure force may be overcome and the electronic device folded into the open position by use of one finger.

9. The electronic device of claim 1, wherein the first portion includes a display element and the second portion includes a keyboard.

10. The electronic device of claim 1, wherein the first portion includes a first display element and the second portion includes a second display element.

11. The electronic device of claim 1, wherein the first portion is a first portion of a foldable display and the second portion is a second portion of the foldable display.

12. A method of manufacturing a magnetic closure system for an electronic device comprising:
    providing a magnetic material;
    forming a first magnet array from the magnetic material; and
    forming a second magnet array from the magnetic material;
    wherein:
        each of the first magnet array and the second magnet array include a first set of magnetic elements and a second set of magnetic elements,
        the first set of magnetic elements of the first magnet array and the first set of magnetic elements of the second magnet array are configured to provide an attractive magnetic force that biases the electronic device in the closed position,
        the second set of magnetic elements of the first magnet array and the second set of magnetic elements of the second magnet array are configured to provide a repelling magnetic force that partially counteracts the biasing from the attractive magnetic force as a gap between a first portion and a second portion of the electronic device decreases,
        a pole size of a set of magnetic elements is the distance from the middle point of a magnetic element in the set having one polarity to the middle point of the next magnetic element in the set having an alternating polarity, and
        for the first or second magnet array, a pole size of the second set of magnetic elements are selected such that the pole size is smaller than a pole size of the first magnetic elements.

13. The method of manufacturing of claim 12, further comprising:
    positioning the first magnet array in the first portion of the electronic device; and
    positioning the second magnet array in the second portion of the electronic device.

14. The method of manufacturing of claim 12, wherein, for the first or second magnet array, the first or second set of magnetic elements includes an array of magnets having alternating patterns of north polarities and south polarities.

15. The method of manufacturing of claim 12, wherein the pole size of the second set of magnetic elements is selected such that the pole size of the second set of magnetic elements is between 0.5 times and 1.5 times a gap size between a first and second magnet in the second magnet array while the electronic device is in the closed position.

16. The method of manufacturing of claim 12, further comprising removably connecting a screen guard to a display portion of the first portion, the screen guard being configured so that it is positionable between the first portion and the second portion when the electronic device is in the closed position.

17. The method of manufacturing of claim 16, wherein a closure force of the electronic device while in the closed position with the screen guard between the first portion and the second portion is within 1 Newton of a closure force of the electronic device while in the closed position without the screen guard between the first portion and the second portion.

18. The method of manufacturing of claim 12, wherein the first portion includes a display element and the second portion includes a keyboard.

19. The method of manufacturing of claim 12, wherein the first portion includes a first display element and the second portion includes a second display element.

20. The method of manufacturing of claim 12, wherein the first portion is a first portion of a foldable display and the second portion is a second portion of the foldable display.

* * * * *